United States Patent Office 2,756,255
Patented July 24, 1956

2,756,255
METHOD OF PREPARING DIPHENYL ACETIC ACID

George Kesslin, New York, N. Y., assignor to Kay-Fries Chemicals, Inc., West Haverstraw, N. Y., a corporation of New York No Drawing. Application October 10, 1951,
Serial No. 250,814

6 Claims. (Cl. 260—515)

This invention relates to an improved method of preparing pure diphenyl acetic acid in a single step process, giving unexpectedly high yields, and utilizing the lower aliphatic esters of glyoxylic acid, such as the hemi-acetals and benzene as reagents, with chlorsulfonic acid and sulfuric acid as condensing agents.

In my prior application, Ser. No. 137,033, filed January 5, 1950, for Method of Preparing Diphenyl Acetic Acid, now abandoned, I have disclosed and claimed a novel process utilizing one mol of glyoxylic acid and two (2) mols of benzene, in an excess of benzene, with chlorsulfonic acid as a condensing agent. In the practice of this process the yield of diphenyl acetic acid (93.2% pure) was 67.2% of theory.

I have now found that by starting with a lower aliphatic ester, such as ethyl glyoxylate hemi-acetal, the process can be carried out with unexpected results, viz., the diphenyl acetic acid is recovered directly, as a 100% pure product, requiring no recrystallization or other purifying steps, and the yield of the directly produced, pure product is very much greater than that of the crude (93.2% pure) diphenyl acetic acid produced according to my prior process, above identified.

It is, therefore, among the features of novelty and advantage of the present invention to provide an improved process for the one-step preparation of 100% pure diphenyl acetic acid.

It is also a feature of novelty and advantage of this invention to provide such an improved process wherein the primary reagents comprise the lower aliphatic esters of glyoxylic acid and benzene, with chlorsulfonic acid and sulfuric acid as condensing agents.

It is a further feature of novelty and advantage of this invention to provide such an improved process wherein the primary reagents comprise ethyl glyoxylate-hemi-acetal and benzene, and the preferred condensing agent is chlorsulfonic acid.

The above and other desirable features of novelty and advantage of the invention herein will be apparent from the accompanying specification and claims, in which a preferred embodiment of the invention is set forth and claimed.

The lower aliphatic esters of glyoxylic acid comprehended herein are the methyl, ethyl, propyl, and butyl compounds, and their isomers.

The process herein is exemplified by the following run:

Materials 15.0 gms. ethyl glyoxylate-hemi-acetal
100.0 cc. benzene
58.3 gms. chlorsulfonic acid
9.5 gms. NaOH in 300 cc. water
100.0 cc. methanol
25.0 gms. 96% $H_2SO_4$—made up to a 20% solution.

Procedure

The chlorsulfonic acid was added, with agitation, to the mixture of benzene and ester, over a one-hour period, at 20–30° C. This temperature was maintained for one hour longer, and then raised to 50° C., where it was held for another half-hour. The total reaction time was 2½ hours.

The resulting crude product, diphenyl acetic acid, is then purified in the following manner:

The reaction mixture was quenched in approximately 600 cc. of cold water, and the oily layer (top layer) was separated, then refluxed for 3 hours with a mixture comprised of 9.5 gms. NaOH, 300 cc. water, and 100 cc. methanol. The methanol was then distilled off at a vapor temperature of 95° C., and the distilland extracted with 50 cc. of toluene. The aqueous layer formed was separated from the toluene layer and blown free of entrained toluene. The toluene-free aqueous liquor was decolorized by treating with 0.5 gm. decolorizing carbon (NuChar) for one-half an hour, then filtered. The filtrate was acidified with the diluted (20%) sulfuric acid, until red to alkali test paper, and the precipitated pure diphenyl acetic acid was filtered, dried, weighed and analyzed.

Results

Weight of diphenyl acetic acid __ 16 gms. (analyzing 100% pure by titration).
Melting point _____ 145.9–146.4° C.
Theory _____ 21.2 gms.
Yield _____ 74.4%.

NOTE.—A mixed melting point determination with a known sample of pure diphenyl acetic acid showed no lowering of the melting point (M. P. 146.1–146.9° C.).

It will now be appreciated that there has been provided an improved process for the direct preparation of 100% pure diphenyl acetic acid from lower aliphatic esters of glyoxylic acid and benzene, using an acid condensing agent.

What is claimed is:

1. The improved method of preparing diphenyl acetic acid comprising reacting one mole of a lower aliphatic ester of glyoxylic acid hemi-acetal and two moles of benzene, in the presence of a condensing agent of the group consisting of chlorsulfonic acid and sulfuric acid.

2. The improved method of preparing diphenyl acetic acid comprising reacting one mole of ethyl glyoxylate hemi-acetal and two moles of benzene in the presence of chlorsulfonic acid as a condensing agent.

3. The improved method of preparing diphenyl acetic acid comprising reacting one mole of ethyl glyoxylate hemi-acetal and two moles of benzene in the presence of sulfuric acid as a condensing agent.

4. The improved method of preparing diphenyl acetic acid comprising reacting one mol of ethyl glyoxylate hemi-acetal and two mols of benzene, in an excess of benzene, and in the presence of an acid condensing agent of the group consisting of chlorsulfonic acid and sulfuric acid.

5. The improved method of preparing diphenyl acetic acid comprising preparing a reaction bath comprised of reactive amounts of ethyl glyoxylate hemi-acetal and benzene in an excess of benzene as a carrier, adding chlorsulfonic acid, as a condensing agent, to the reaction mixture over a one hour period, and at room temperature; maintaining the reaction at room temperature for another hour; then raising the temperature of the reaction mixture to 50° C., and maintaining the mixture at this temperature for one-half an hour.

6. The method of recovering diphenyl acetic acid from a reaction mixture prepared according to the method of claim 5, comprising quenching the reaction mixture in cold water, whereby to form an oily top layer containing the diphenyl acetic acid ethyl ester and a bottom aqueous layer; separating the layers; refluxing the oily layer with an alcoholic solution of sodium hydroxide; heating the refluxed mixture, and distilling off the ethanol at a vapor temperature of 95° C.; extracting the alcohol-free residue with toluene, whereby an aqueous layer and a toluene layer are formed; blowing the aqueous layer with air to remove the toluene therein, and decolorizing the toluene-free residue; acidifying the decolorized residue to precipitate pure diphenyl acetic acid; and filtering and drying the acid.

References Cited in the file of this patent

UNITED STATES PATENTS 2,517,856   Elkinton et al. _____ Aug. 8, 1950

OTHER REFERENCES

Boettinger: Archiv. de Pharm., vol. 233, pp. 111–118 (1895).

Ostromisslenski: Ber. Deut. Chem., vol. 41, page 3029, No. 3034 (1908).

Vieles et al.: Bulletin Soc. Chim. de France, vol. 1947, pp. 247–251.